United States Patent [19]

Beaulieu et al.

[11] Patent Number: 5,502,637
[45] Date of Patent: Mar. 26, 1996

[54] INVESTMENT RESEARCH DELIVERY SYSTEM

[75] Inventors: Roland C. Beaulieu, Littleton; David R. Cutright, Newton, both of Mass.

[73] Assignee: Thomson Shared Services, Inc., Boston, Mass.

[21] Appl. No.: 260,025

[22] Filed: Jun. 15, 1994

[51] Int. Cl.⁶ ................................................. G11B 19/00
[52] U.S. Cl. ............................................................ 364/408
[58] Field of Search .............................. 364/401, 419.19, 364/400, 408; 395/925, 934

[56] References Cited

U.S. PATENT DOCUMENTS

| | | |
|---|---|---|
| 4,139,901 | 2/1979 | Ganske et al. . |
| 4,186,438 | 1/1980 | Benson et al. . |
| 4,532,554 | 7/1985 | Skala . |
| 4,553,261 | 11/1985 | Froessl . |
| 4,748,678 | 5/1988 | Takeda et al. . |
| 4,815,030 | 3/1989 | Cross et al. ............................ 364/900 |
| 4,941,125 | 7/1990 | Boyne . |
| 5,109,439 | 4/1992 | Froessl . |
| 5,187,750 | 2/1993 | Behera . |
| 5,230,073 | 7/1993 | Gausmann et al. . |
| 5,253,341 | 10/1993 | Rozmanith et al. . |
| 5,283,731 | 2/1994 | Lalonde et al. ........................ 364/401 |
| 5,287,497 | 2/1994 | Behera . |
| 5,345,586 | 9/1994 | Hamala et al. ......................... 395/650 |
| 5,406,557 | 4/1995 | Baudoin .................................. 395/200 |

OTHER PUBLICATIONS

"First Call. The Wisdom Of Wall Street"—1992 First Call Corporation (A Thomson Financial Services Company).
"First Call"—1994 First Call Corporation (Feb. 1994).
"First Call RTEE (Real Time Earnings Estimates)"—1993 First Call Corporation.
"First Call Fundamentals"—1993 First Call Corporation.
"First Call International" 1993 First Call Corporation.
"First Call. The Wisdom Of Wall Street." 1992 First Call Corporation (a Thomson Financial Services Company).

Primary Examiner—Donald E. McElheny, Jr.
Attorney, Agent, or Firm—St. Onge Steward Johnston & Reens

[57] ABSTRACT

An investment research delivery system is provided comprising a host for receiving investment research in a page description format, a transmitter at the host location for transmitting the page description format investment research, a database at a location remote from the host for storing investment research received from the host, permitting current research to be immediately rendered by investors in the author's original form. Investment research which has been stored on the remote database for the longest time is deleted as necessary to store the current research. Preferably, the host receives investment research from a plurality of brokers and broadcasts the investment research to a plurality of investors.

26 Claims, 6 Drawing Sheets

INVESTMENT RESEARCH DELIVERY SYSTEM

FIELD OF THE INVENTION

The invention relates to a delivery system for investment research in which portions of an investment research database are stored at a remote location for real time access by a user/investor. More specifically, the invention relates to a system for notifying a user/investor of current investment research information and reports of interest to the user/investor and for providing access to the information and reports from the user/investor location in the broker/author's original form and in real time.

BACKGROUND OF THE INVENTION

Brokers and security issuers produce tens of thousands of investment research reports, sales brochures, annual reports and the like annually. These reports are carefully prepared and edited by analysts and marketers from textual and graphical information using desk top publishing systems. The completed reports which may be color printed and run many pages in length are delivered not only to the brokers' branch and retail offices, but also to institutional investors. Millions of dollars are spent to prepare, print and mail these reports, yet no mechanism other than word of mouth exists for authors/brokers to determine readership of their reports.

On the other side of Wall Street, institutional investors are besieged with investment research reports —many portfolio/fund managers receive over three feet of investment research reports per week. As a result, as many as 65% of the reports are thrown out unopened, and less than 10% of the reports are ever read. Even the 35% or so of equity research reports which are retained by institutions, readership is likely to be very low since there is no easy way to quickly access reports relevant to any particular subject of interest. Further, the cost of report retention is significant and may be prohibitive.

What is desired by authors/brokers therefore is a system for distributing their investment research reports on a real time basis in its original form and for directing investors' attention to reports of particular interest to them. A system which subsequently provides feedback on report readership is also desired. What is desired by institutional investors is a system for obtaining real time access to current investment research reports of primary interest to the investor in the authors'/brokers' original form (including text, graphics and layout). The capabilities to archive older investment research and to enable searching of current and archived reports is also desired.

Multi-user database systems for electronically storing and retrieving documents are well known. Some of these systems, such as disclosed in U.S. Pat. Nos. 4,553,261 4,748,678 4,941,125 5,109,439 5,187,750 and 5,287,497 store documents as images. A disadvantage of this approach is it requires an excessive amount of memory to store a page of text, increasing costs and access times. A further disadvantage is that text stored as an image may not be retrieved using a word search. Moreover, even though storage as an image permits retrieval of the document in its original form, the digitizing process necessarily reduces resolution of the image from the original, such that a document reconstituted from the image data will be of lower quality than an author's original, and consequently may be less well-received by a reader.

U.S. Pat. No. 4,186,438 and col. 2, lines 26–29 of U.S. Pat. No. 5,230,073 disclose a system including a complete host database and a partial local database of the most recently requested files. The local database is periodically updated by deletion of the least frequently used files. The system of the '438 patent is designed for airline reservations such that the host and local databases are fairly static and the local database generally only includes flight information on regional airports for fast access, while information on other airports is available from the host. In addition to faster access for most users, the overall cost is reduced and reliance on communication links is eliminated.

The '073 patent is directed to a broadcast oriented database architecture for large volume inquiry systems (i.e. operator assistance) including a data pump for cyclically broadcasting the entire database over a high band width medium (e.g. optical fiber). The broadcast may be analyzed by a plurality of record retrieval elements simultaneously, and no indexing of the database is necessary. An upstream channel from each retrieval element to the pump is provided for updating the database.

Other database systems, such as Thomson Financial Services' First Call system for equity research information, store only the text portions of documents. These databases are more memory efficient than image-based systems and support word-search document retrieval, but are generally not capable of rendering the document in the author's original form, and do not typically include storage of nontext portions of documents such as graphics and layout information.

More recently, portable ROMs have been introduced which store mixed format documents as combinations of text with graphics, sound, video and the like. A disadvantage of these systems is that the stored information is not able to be distributed on a real time basis due to the time required for manufacturing and delivery of the ROM. Further, the time and effort required for switching ROMs and for accessing information on the ROMs may also be disadvantageous. The cost of providing enough storage to each user to permit archival searching may be prohibitive, and the portability of these systems does not lend itself to tracking readership of individual documents.

There is a need in the database art to provide a system which notifies users of current documents of interest to the users, and permits immediate retrieval from users' locations of such documents in the author's original form. A system which also permits searching of current and archived documents at a shared-access host location is also needed, as is a system which subsequently reports use of documents back to authors.

SUMMARY OF THE INVENTION

Accordingly, it is an object of the invention to provide a system for notifying users of current documents of interest to the users.

Another object of the invention is to provide a system in which current documents of interest to the user are stored in the author's original form at the user's location.

A further object of the invention is to provide a system permitting real time access to current documents of interest to the user in the author's original form.

Still another object of the invention is to provide a system for distributing documents from multiple authors and for reporting readership of the documents back to the authors.

Yet another object of the invention is to provide a system of the above character for distributing brokers' equity research to institutional investors.

Yet another object of the invention is to provide a system of the above character in which current and archived documents are searchable by users at a shared-access or host location.

Yet still another object of the invention is to provide a system of the above character in which current documents are broadcast to all users but are only available for storage at user locations according to instructions received from authors.

These and other objects of the invention are achieved by provision of a system for delivery, of an author's investment research to an investor comprising a host for receiving investment research in a page description format, a transmitter at the host location for transmitting the page description format investment research, and a database at a location remote from the host for storing investment research received from the host, permitting current research to be immediately rendered by investors in the author's original form. Investment research which has been stored on the remote database for the longest time is deleted as necessary to store the current research. Preferably, the host receives investment research from a plurality of authors and broadcasts the investment research to a plurality of investors.

Preferably, the system includes one or more author stations at remote broker locations for converting the investment research to the page description format. Most preferably the author stations may also be used by authors to prepare entitlement lists indicating which investors may receive each author's research and which investors may not.

Preferably, the system includes one or more view stations at investor locations for rendering the investment research from the page description format back to the author's original form. Most preferably, the view stations notify portfolio managers when the remote database has received a new piece of investment research of interest to the portfolio manager. The view stations also preferably convert the page description format to PostScript format for printing the research in the author's original form.

Most preferably, the system includes both author stations and view stations. The author stations are used to prepare headlines regarding the origin and subject matter of the investment research, and the view stations are used to prepare profiles of portfolio manager's interests. Upon comparing the headlines to the profiles, the host generates instructions for the view stations regarding which portfolio manager to notify of which piece of investment research. The host also compares the entitlement lists to the profiles for generating instructions regarding which remote databases may store which pieces of investment research.

The invention and its particular features and advantages will become more apparent from the following detailed description considered with reference to the accompanying drawings.

DETAILED DESCRIPTION OF THE INVENTION

Figure 1:
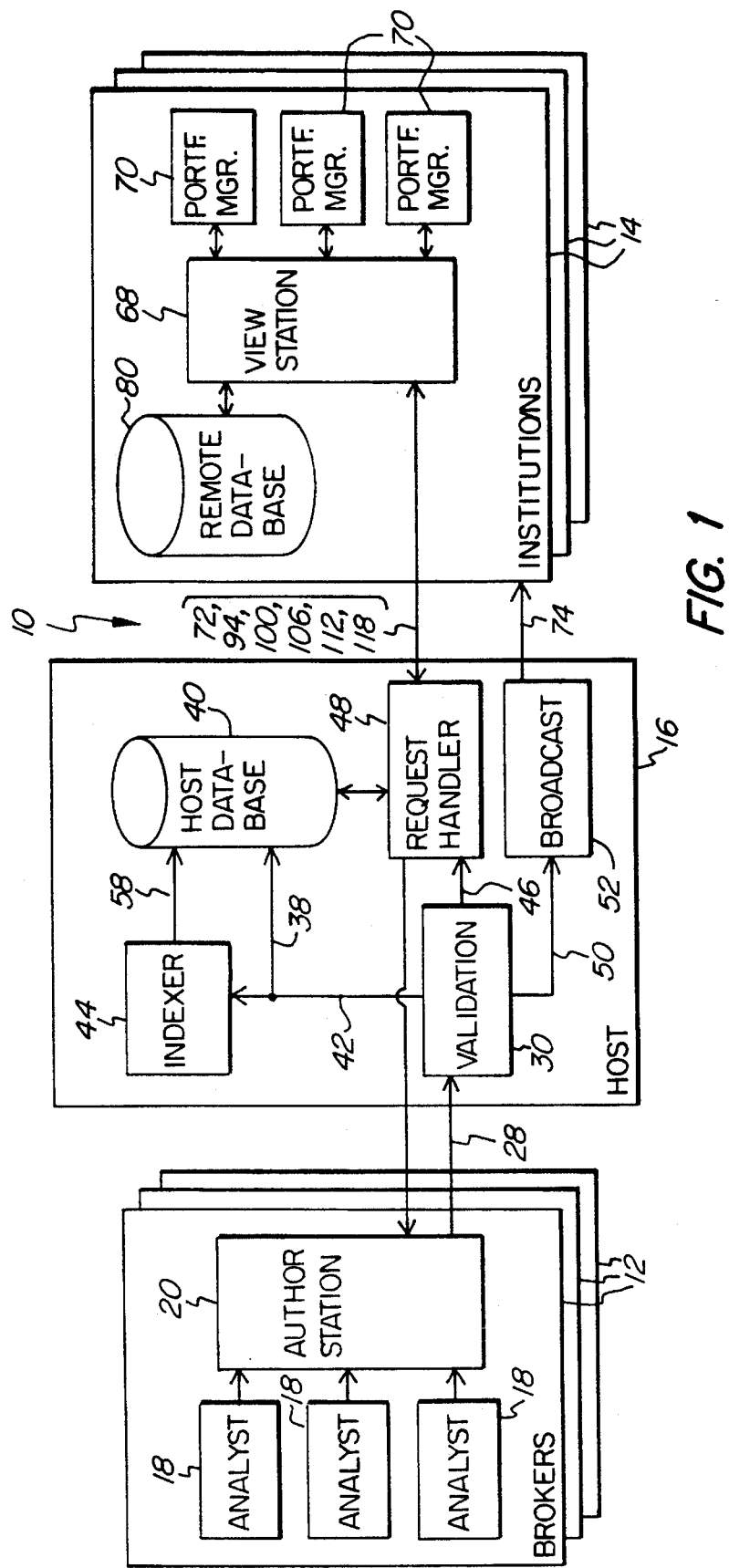
FIG. 1 is a functional block diagram of an investment research delivery system in accordance with the invention.

FIG. 1 is a block diagram depicting an investment research delivery system 10 in accordance with the invention. System 10 is designed to deliver investment research generated by a plurality of brokers 12 to a plurality of institutional investors 14. In addition to brokers 12, investment research within the scope of the invention may also be generated by security issuers for purposes of reporting results, promoting sales, complying with government regulations, and the like, and by market watchers for purposes of selling subscriptions to newsletters and the like. As illustrated, investment research generated by brokers 12 is not delivered directly to institutions 14, rather it is delivered to an intermediate host 16. Host 16 then delivers the investment research to institutions 14.

By "investment research" is meant reports, memoranda, notes, promotional materials, annual reports, earnings reports, government filings, and other information concerning a particular security, security issuer, class of securities, or industry, which is generated by brokerage firms, security issuers, market watchers and others, which is relevant to an investment decision. Typically, brokers have a plurality of analysts 18, each of whom concentrates on a particular security, class of securities or industry, and periodically generates investment research concerning their area of concentration. This investment research is produced on desk top publishing or word processing software capable of producing a PostScript (PS) format output file. PostScript is a page description language developed by Adobe Systems for operating output devices such as printers. Using the PS output file, a PS compatible device should be able to render the research in the original form in which it was produced by the analyst.

Analysts 18 input the PS format investment research to an author station 20 located at the broker 12 location. Author station 20 may comprise a stand-alone personal computer (PC) or workstation, a mainframe terminal, or a LAN or other installation of multiple interconnected computers. Preferably, author station 20 is one or more PCs with the following minimum system configuration: 486/66 with 12 Mb RAM 200 Mb disk generally connected to author's LAN. It is understood that the analysts' word processing and/or desk top publishing software may, but is usually not, installed on author station 20.

Figure 2:
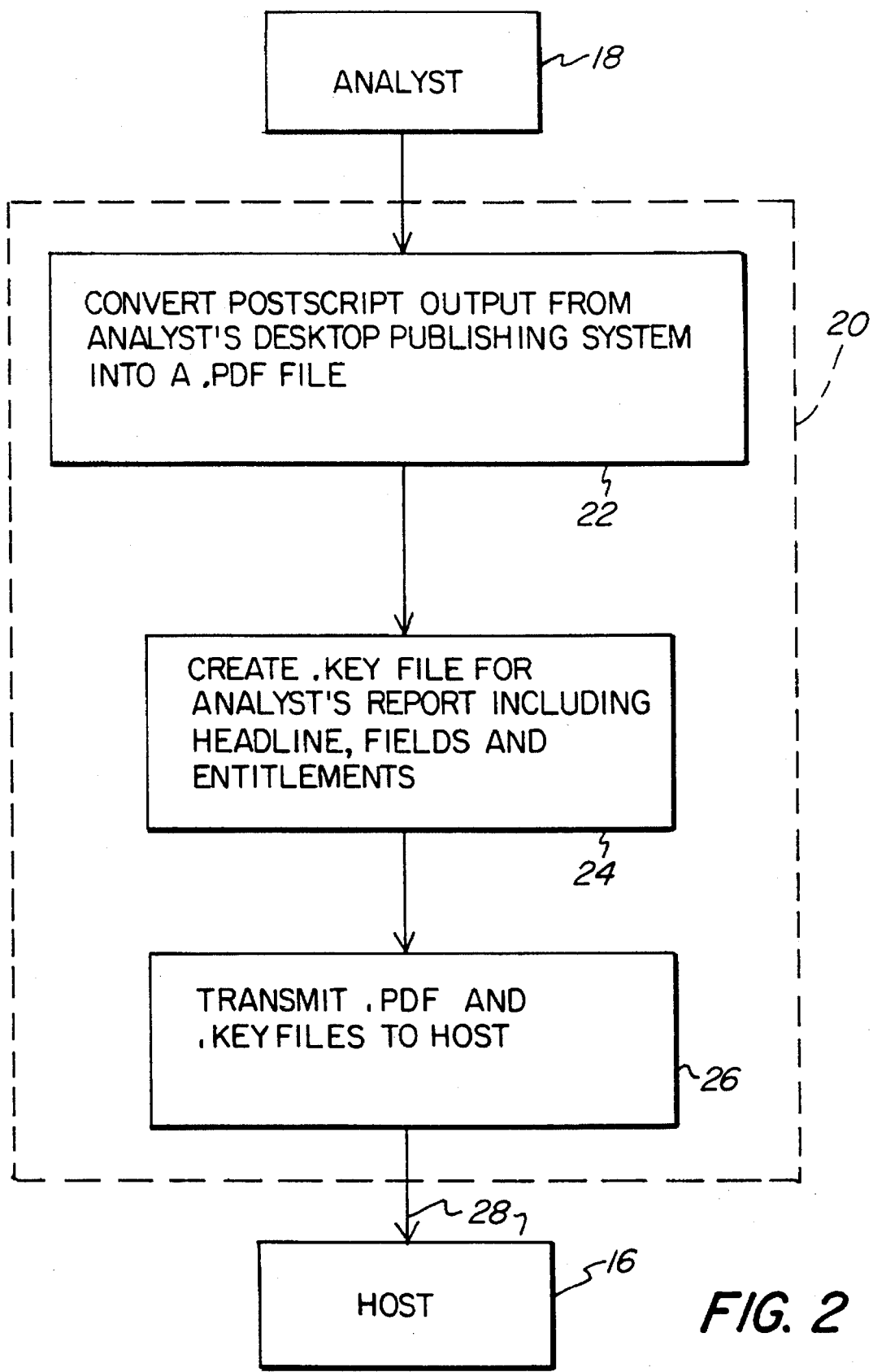
FIG. 2 is a functional block diagram detailing the author station block of the system of FIG. 1.

Author station 20 includes software for receiving analysts' PS format research and preparing it for distribution to institutions 14 by host 16. Referring now to FIG. 2, the function of author station 20 or software running thereon is depicted in a block diagram.

As illustrated at 22, author station 20 converts the PS format research received from the analyst into a portable document format or .pdf file. By "portable document format" is meant a distillation of the font, layout and design characteristics of the analysts' original document, as represented in the PS file, for ease of data communication and transmission. Both PS format and portable document format are page description formats for rendering documents in their original form. This function of author station 20 is preferably achieved by Adobe Systems' Acrobat Distiller software which is licensed for use in system 10. In the event the conversion from PS format to .pdf file is flawed, a .log file is also generated which details the conversion error or problem.

Another portion of the author station 20 software is illustrated at 24 and permits analysts 18 to create a .key file used by host 16 in delivering the research, and by institutions 14 in using and searching the research. The .key file includes a headline identifying the research, an entitlement list for distributing the research, and the following field information used for searching archived research: broker, analyst, symbol, country, industry, region, subject, and possibly others.

Author station 20 also includes communication software and a modem (not shown) for transmitting at 26 the .pdf and .key files to host 16 as indicated by communication link 28 (see FIG. 1). It is understood that the .log file may also be transmitted in cases where the conversion is problematic. Communication link 28 is a public telephone line, however, it is understood that a dedicated or other wire, and/or wireless links may also be used. By "wire" is meant any physical connection, whether by optical fiber, coaxial cable, twisted pair or otherwise, and by "wireless" is meant cellular, microwave, IR, laser or other non-physical connection.

Figure 3:
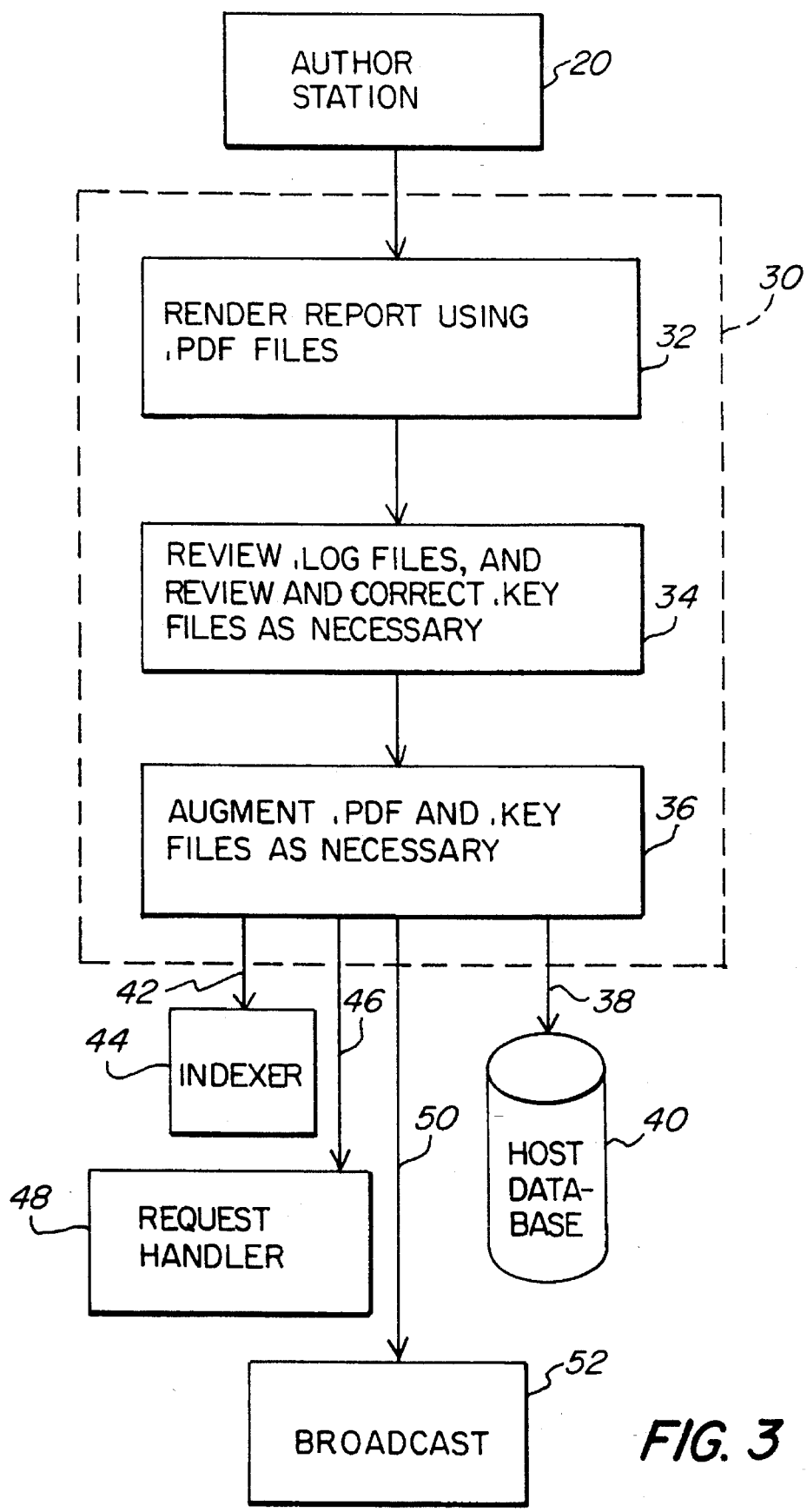
FIG. 3 is a functional block diagram detailing the validation block of the system of FIG. 1.

Investment research .pdf and .key files are continuously received at host 16 from the plurality of author stations 20 at brokers' locations. Research received by host 16 is first validated as illustrated at 30 in FIGS. 1 and 3. The main purposes of validation are to preserve and maintain the integrity of research distributed by system 10, and to improve the usefulness and ease of using research distributed by system 10.

The first step in validating research is to render the research at 32 from the .pdf file for display on an editor's terminal (not shown) to identify obvious errors. It is understood that many editors may be used and that they are preferably linked together in a network configuration. Any such errors typically arise in creation of the PS output by the analyst's word processing or desk top publishing software, due to the inconsistent quality of PS drivers. Errors may then be reported back to the analyst by the editor. It is understood that this step in the validation process may also conveniently be performed by the analyst at author station 20 where the original conversion from PS format to .pdf files was completed. In any event, due to time, resource and cost restraints, host 16 may elect not to perform this validation step on some of the research received from brokers 12, especially when it is known that the brokers' desk top publishing software has a sophisticated PS driver.

In the event the conversion to portable document format was somehow flawed, the .log file will need to be reviewed at 34 to determine the source of the error. In some cases it may be desirable to reconvert the analyst's original document file to PS format, for example, with a different PS driver. As shown at 34, the .key file is also reviewed and may need to be corrected, for example, to replace invalid field information.

In addition to review functions, the validation process and/or the editor may also add information to the .pdf and .key files at 36. An example of the type of information added to these files is a Table of Contents and so-called "Hypertext" markers to the .pdf files. The markers permit a user to quickly move through the analyst's text between portions which correspond to sections outlined in the table of contents. It is understood that the table of contents and markers do not alter the analyst's text, and that they may be input at author station 20 as easily as at host 16. Other things which may be added to the .key files include corresponding ticker symbols for additional exchanges which trade the security, e.g. CUSIP, ISIN, SEDOL and the like. In this regard, host 16 is solely designed to deliver the investment research of others, and not to produce investment research.

Validated .pdf and .key files are transferred along line 38 for storage in host database 40, along line 42 to indexer 44, along line 46 to request handler 48, and along line 50 for broadcast at 52 (see FIG. 1). Prior to this transfer, the .pdf file is assigned a unique filename for storage on host database 40. This unique filename is used for cross-reference purposes.

Assuming that host 16 receives about 200 pieces of investment research per day with an average size of 10 pages (8 pages of text and 2 pages of bit-mapped graphics), host database 40 will require about 25 gigabytes of storage to archive each years' worth of investment research. This average piece of research may be transmitted over telephone lines, for example from author station 20 to host 16, in about 3 minutes at 14.4 kbps.

It is understood that host 16 may comprise a stand-alone PC or workstation, a mainframe, or a LAN or other installation of multiple interconnected computers. Preferably, host 16 is a network of Sun Sparcstation 1000 systems connected by optical fiber to an array of storage devices for data transfer at rates of 25 Mb/s full duplex.

Figure 4:
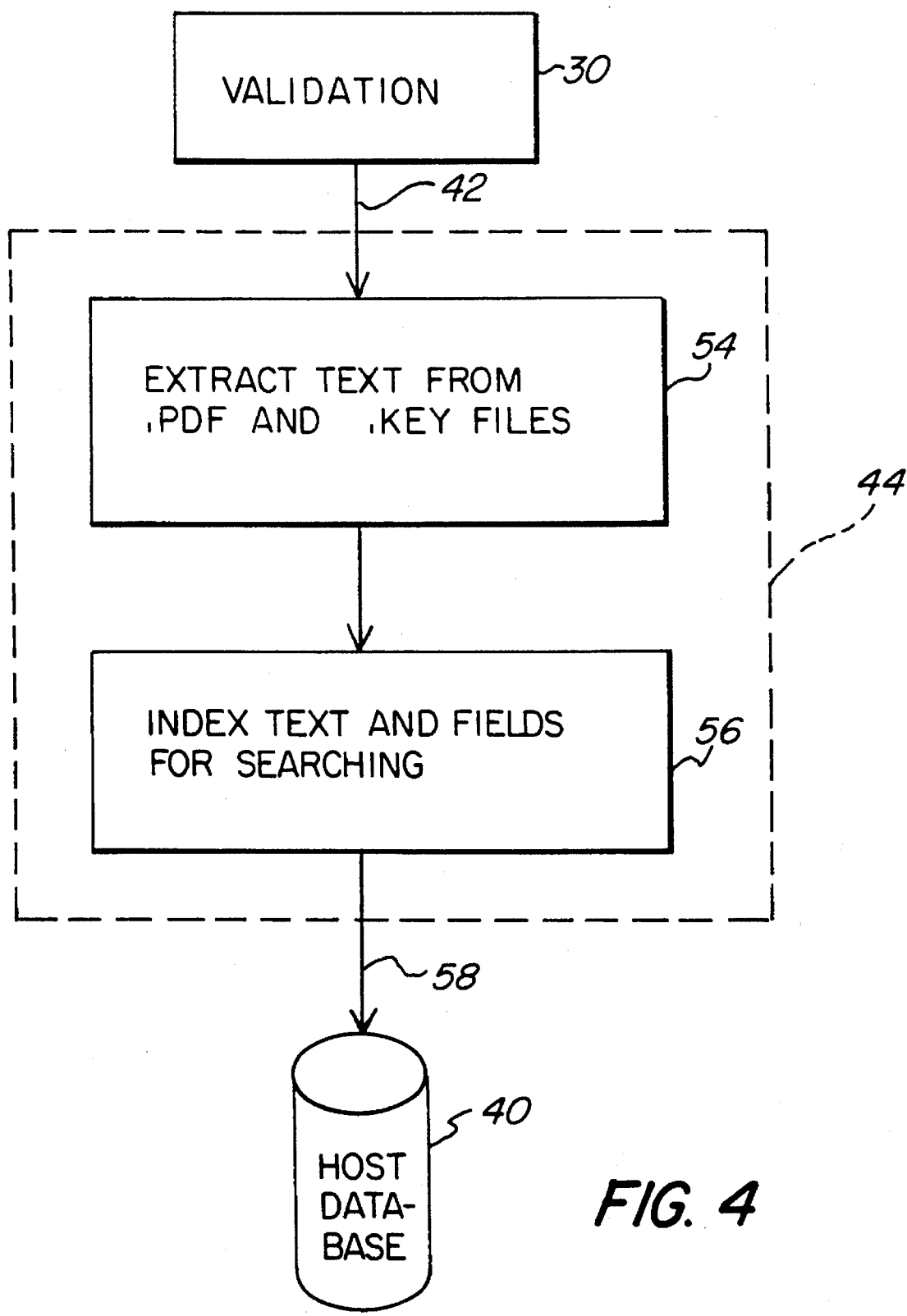
FIG. 4 is a functional block diagram detailing the indexer block of the system of FIG. 1.

Referring now to FIG. 4, operation of indexer 44 is illustrated. Indexer 44 performs two functions, each represented by a block on FIG. 4. These functions are performed by software run on a computer linked to or the same as that used for validation. The first piece of software, or function of indexer 44, extracts text at 54 from the .pdf files and headline and fields of the .key files of each piece of investment research. In this regard, the headline and field information may be word-searched as well as the investment research text itself. Software for extracting ASCII information from the .pdf file is available from Adobe Systems and is licensed for use in system 10. To this ASCII information is appended the ASCII from the .key file headlines and fields.

Next, each word of the extracted ASCII is indexed for searching at 56 by full text engine software available from Fulcrum of Ottawa, Canada. In addition to word searching, Fulcrum also provides the capability of field searching the contents of .key files. This is accomplished by indexing the fields in addition to the words for each piece of investment research. These indices are transferred along line 58 for storage on host database 40 in conjunction with the unique file name associated with the .pdf file for each piece of investment research, so that identification of either index during a search will permit retrieval of the corresponding .pdf file.

Figure 6:
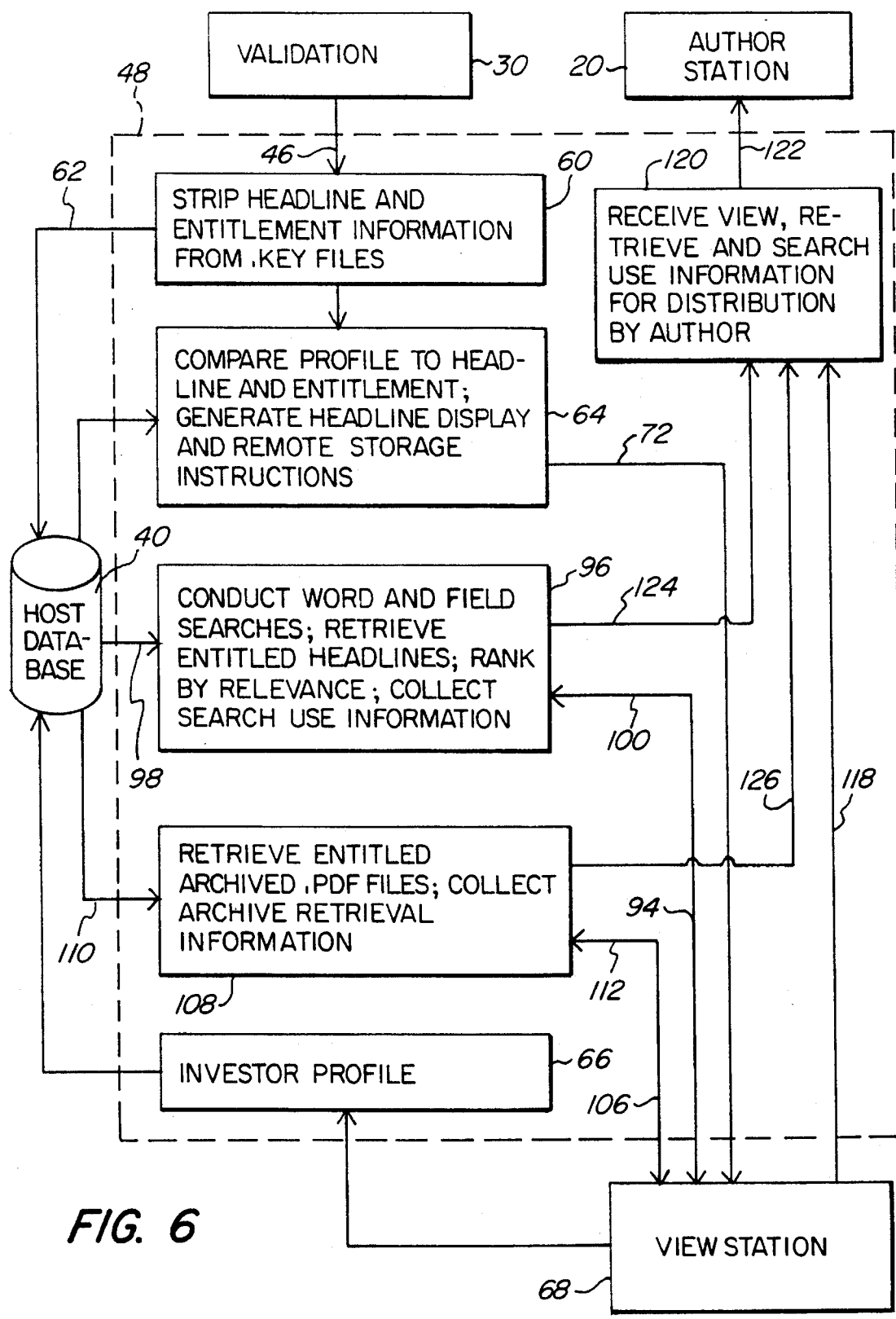
FIG. 6 is a functional block diagram detailing the request handler block of the system of FIG. 1.

Referring now to FIG. 6, the function and operation of request handler 48 is illustrated. As with other functions of host 16, request handler 48 may comprise software running on a computer or network connected to host database 40 and possibly also including validation and indexing software. Validated .key files pass along line 46 to request handler 48, and the headlines and entitlement information are removed at 60 for storage on host database 40 along line 62. It is understood that the headlines and entitlement information are stored in conjunction with the unique file name associated with the .pdf file for each piece of investment research, such that all information stored regarding a piece of investment research may be retrieved by identifying either the headline or an index therefor.

At 64, request handler 48 compares entitlement information to an investor profile 66 previously received from a view station 68 and stored on host database 40. By "entitlement" information is meant a broker's or analyst's list of which institutions are permitted access to its investment research and which are not. Investor profile 66 is an indication of the investment research of interest to a particular institutional investor 12 or portfolio manager 70 (see FIG. 1). Comparing the entitlement information to the identity of all investors submitting profiles, request handler 48 generates instructions at 64 regarding which investors are permitted to store and access each piece of investment research and which investors are not. Also, comparing the headlines to the investor profiles, request handler 48 generates instructions at 64 regarding which headlines to display on which author stations or terminals for notifying portfolio managers of receipt of investment research of interest to the portfolio managers. Headlines will only be displayed for notifying portfolio managers if the institution is entitled to access the research. The remote storage and headline display instructions, and the headline are passed along line 72 to the appropriate view stations 68 for execution upon receipt of the corresponding .pdf files for each piece of investment research. To assume prompt transmission of these instructions to view stations 68, line 72 is preferably a dedicated open channel for receipt of host 16 communications.

As with author stations 20, view stations 68 are located at investor locations remote from the host and may comprise a stand-alone PC or workstation, a mainframe terminal, or a network or other installation of multiple computers each of which may be available to numerous portfolio managers 70. By "institutional investor" is meant retirement and pension funds, mutual fund companies, investment advisors, insurance companies, and other investors which manage or trade for two or more accounts. By "portfolio manager" is meant a person or entity making investment decisions or providing investment advice on a particular account at an institutional investor.

Referring briefly to FIG. 1, the .pdf files are broadcast at 52 from host 16 over a dedicated satellite communication link 74 to institutions 14. A dedicated satellite is used in order to provide instant worldwide communication of large quantities of data substantially continuously. It is understood that other data communication systems may be utilized such as microwave, fiber optic or coaxial and that factors such as the geographical proximity of institutions 14 with each other and host 16, the volume of data, the permissible distribution time, and the like may bear on the system selected.

Figure 5:
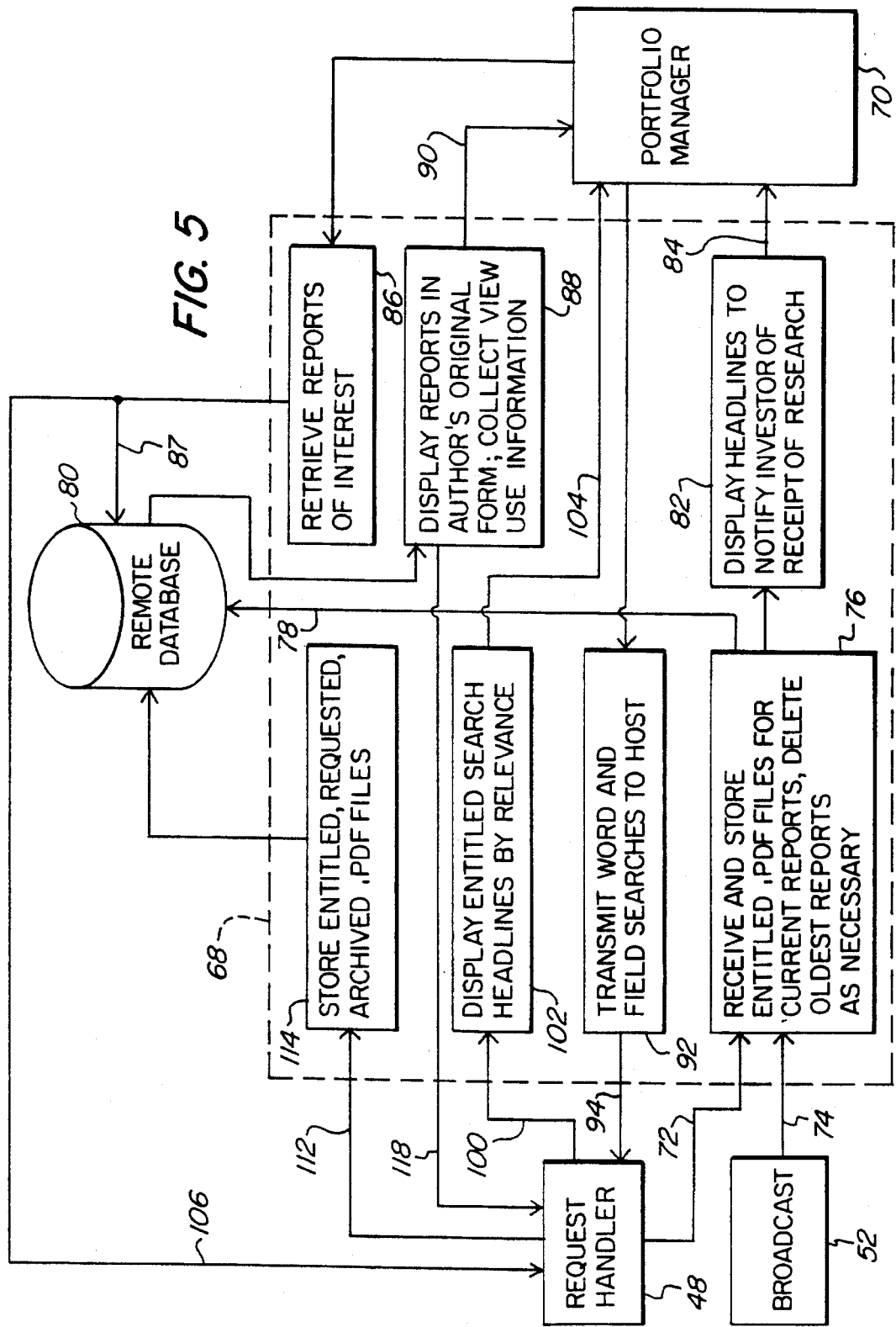
FIG. 5 is a functional block diagram detailing the view station block of the system of FIG. 1.

Referring now to FIG. 5, upon receipt of the broadcast and the entitlement instructions by view station 68, instructions are interpreted at 76 and the entitled .pdf files are stored along line 78 on remote database 80 for immediate access by portfolio manager 70. At 82, the investor notification instructions are interpreted and appropriate headlines are displayed on each view station 68, or terminal thereof, to notify portfolio managers 70 along line 84 of receipt of current investment research of interest to each portfolio manager. In this regard, system 10 enables delivery of analyst's research within hours or even minutes of its completion by analysts. Further, the system directly notifies portfolio managers to receipt of newly completed and delivered research of interest to the portfolio managers. This notification relieves institutions of the burden of sifting through vast quantities of investment research in an effort to locate pertinent information. Moreover, the notification also increases readership of analysts' reports.

Upon notification of receipt of investment research of interest, portfolio manager 70 may retrieve the research at 86 from remote database 80 (located near the portfolio manager) along line 87 and immediately display it at 88 in the analysts' original form for review by the portfolio manager. The portfolio manager's decision as to which pieces of research to display and review is accomplished by the portfolio manager's review of the headlines used to notify the portfolio managers of receipt of the research. The headlines include an identification of the analyst and broker who generated the research, the title and subject matter of the research, and the length of the research. It is understood that other information may and could be included in the headline such as the ticker symbol of securities about which the research relates, the geographic region to which the report relates, and similar types of information.

Using a headline displayed on a view station 68, the corresponding .pdf file for the particular piece of investment research requested by portfolio manager 70 may be retrieved from remote database 80 using the unique filename. Similar to host database 40, the .pdf file for each piece of investment research is stored on remote database 80 with the corresponding unique filename, so that identification of a particular headline permits retrieval of the corresponding .pdf file.

Those .pdf files which have been stored on remote database 80 the longest are deleted as necessary for storage of newly received, current .pdf files at 76. In this manner, remote database 80 contains only current entitled investment research, approximately two months worth, which is available for immediate display and review by portfolio managers of the institution. Unlike host database 40, the word and field indices corresponding to each piece of investment research are not stored on remote database 80. All searching is done on shared-access host database 40 which contains all investment research provided by analysts: current as well as archived research, and all research regardless of entitlement.

Upon retrieval of requested .pdf files, ACROBAT READER or ACROBAT EXCHANGE software licensed for system 10 from Adobe Systems is used to render the .pdf files for display at 88. This rendering step is similar to that which may be performed for validation (see FIG. 3). If a hard copy is desired, the same software is used to reconvert the .pdf files to PS for printing by view station 68. Rendering and reconversion permit investment research to be presented to and reviewed by portfolio managers 70 in exactly the form originally created by analysts 18. Analysts spend time and effort to make their research visually appealing and readable, however, prior art distribution systems treat such documents either as images which can not be efficiently searched, or merely as text, eliminating a large part of authorship and salesmanship.

Portfolio managers may also use view station 68, by means of software running thereon, to transmit word and field searches at 92 to request handler 48 via line 94. Host 16 provides dial-up, shared-access for searching by institutions 14 of both current and archived investment research. By "current" is meant investment research stored on one or more remote database 80 at an investor location. By "archived" is meant investment research which has been deleted from remote databases 80. Host database 40 includes both current and archived investment research. Word searches are conducted on the full text of the research as well as the .key file fields. Field searches are conducted on only the .key file fields. To improve search efficiency, a "phonetic" search algorithm may be employed to search for typographical errors, alternate spellings, homophones and the like. Also, the efficiency of field searching may be improved by limiting some fields to list and pick entry.

Returning to FIG. 6, illustrating request handler 48, search requests are conducted at 96 and the headlines and entitlement information corresponding to all pieces of investment research matching the request are retrieved from host database 40 along line 98. At 96, request handler 48 reviews the entitlement information to the identity of the requesting portfolio manager 70 and then forwards all entitled headlines matching the request to the appropriate view station 68 along line 100. Referring again to FIG. 5, the entitled search headlines are displayed at 102 for notification of portfolio manager 70 along line 104.

The logic used to generate and report the results of a search enables a portfolio manager 70 to search for a string of words without Boolean connectors. Request handler 48 will retrieve and forward headlines for all pieces of investment research including any one of the words in the string, but will rank these headlines according to the relevance of the research to the request. "Relevance" is determined by both the number of occurrences of words in the search string and the position of occurring words in search string. For example, in a three word search string, one occurrence of the first word in the string is more relevant than two or more occurrences of the second or third words, but one occurrence of both the first and second words in the string is more relevant than one occurrence of the first word only.

In combination, a "phonetic" search algorithm, non-Boolean word string search requests, and relevance search result reporting provide an easy to use, thorough and efficient database research tool. Typically, database search systems report results in reverse chronological order. In system 10, however, portfolio manager 70 has already been specifically notified about the current investment research of interest to him, so that database search results reported on the basis of relevance are more useful, and are more likely to lead the user to the best information in the shortest time.

Upon review of the search result headlines, on view station 68, portfolio manager 70 may elect to retrieve at 86 one or more pieces of investment research in full text. If the research is current, it is retrieved at remote database 80 and is immediately displayed in the analysts' original form at 88. If, however, the research is archived, it must be retrieved from request handler 48 along line 106. Referring again to FIG. 6, entitled, archived .pdf and .key files corresponding to research requested by portfolio manager 70 are retrieved to 108 from host database 40 along line 110. No comparison to the entitlement information is necessary since the files were requested from headlines for entitled research. Retrieved .pdf files for entitled, requested research are returned to view station 68 along line 112.

Returning to FIG. 5, the files for requested research are stored at 114 on remote database 80 along line 116, and are displayed at 88 to provide the requested research in the author's original form. It is understood that display or printing in the author's original form requires portions of most pieces of investment research to be bit-mapped. Even at data transfer rates of 56 kbps and using powerful workstations as view station 68, transmission storage and display of an average piece of archived investment research will take up to several minutes. The inconvenience of this delay is minimized for most uses of system 10 through storage of current research on remote database 80 at the institution's location, enabling research of interest to portfolio manager 70 to be immediately rendered and reviewed in the author's original form shortly after completion by the analyst author.

As investment research is displayed at 88, information is gathered concerning the viewing of each piece of investment research. This view use information is transmitted to request handler 48 along line 118 for distribution at 120 (see FIG. 6) on broker and analyst basis over line 122 to author stations 20. Similarly, search use information is collected at 96 and forwarded over line 124, and retrieval use information is collected at 108 and forwarded over line 126, for distribution at 120 to author stations 20. Brokers enjoy receiving this use information because it quantifies readership of their analysts' research. It is understood that the use information may also be used to improve the delivery of investment research by system 10.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A device for delivering brokers' investment research to institutional investors comprising:

a plurality of author stations at brokers' locations for converting investment research into a portable document format and for generating entitlement information regarding distribution of the research and subject information regarding the subject matter of the research;

a host for receiving the portable document format research and associated entitlement and subject information from the author stations and for receiving profiles of institutional investors' interests from the institutional investors, said host for comparing the profiles to the subject information and for generating instructions regarding notifying institutional investors to receipt of research of interest to them, said host also for generating instructions based upon the entitlement information regarding remote storage of the portable document format research;

a transmitter at the host location for broadcasting the portable document format research, and for transmitting the remote storage and notification instructions to the institutional investors;

a remote database at the institutional investors' locations for receiving the remote storage instructions, and for receiving and storing the portable document format research according to the remote storage instructions, and also for discarding the portable format research which has been stored on the institutional investors' databases for the longest time; and a view station at the institutional investor location and in communication with said institutional investor database for receiving and executing the notification instruction to notify the institutional investor to receipt of research of interest to the institutional investor, said view station for rendering portable document format research stored on said institutional investor database to enable immediate display of the research in the brokers' original forms.

2. The investment research delivery device of claim 1 wherein said author stations receive investment research from a plurality of analysts in PostScript format.

3. The investment research delivery device of claim 1 wherein said view stations convert the portable document format research to PostScript format for printing the research in the brokers original forms for review by said institutional investors.

4. A device for delivering authors' investment research to an investor comprising:

a host for receiving investment research in a page description format and information regarding the subject matter of the research from a plurality of authors, and for receiving a profile of the investor's interests from the investor, said host for comparing the profile to the subject matter information and for generating an instruction regarding notifying the investor to receipt of research of interest to the investor;

a transmitter at the host location for broadcasting the page description format research, and for transmitting the notification instruction to the investor;

a remote database at the investor location for receiving and storing the page description format research; and a view station at the investor location for receiving and executing the notification instruction to notify the investor to receipt of research of interest to the investor, and to enable immediate availability of the research in the authors' original forms.

5. The investment research delivery device of claim 4 wherein said view station renders the page description format research stored on said investor database upon request of the investor.

6. The investment research delivery device of claim 4 wherein said remote database discards as much of the page description format research which has been stored on said investor database for the longest time as necessary to store the received research.

7. The investment research delivery device of claim 4 wherein said host includes a database for storing the page description format research, and wherein said view station transmits search requests to said host, and wherein said host generates an identification of research matching the search requests which is ranked from most to least relevant to the search requests.

8. The investment research delivery device of claim 7 wherein the search request includes no Boolean connectors.

9. The investment research delivery device of claim 7 wherein the search request includes a string of words.

10. The investment research delivery device of claim 9 wherein occurrences of the first word in the string are more relevant than occurrences of the second word.

11. The investment research delivery device of claim 7 wherein said view station retrieves research no longer stored on the investor database from the host database, and discards as much of the research which has been stored on the investor database for the longest time as necessary to store the retrieved research on the investor database.

12. The investment research delivery device of claim 4 wherein said view station collects view use information and transmits it to said host.

13. The investment research delivery device of claim 12 wherein said host distributes the view use information received from said view station to the authors.

14. The investment research delivery device of claim 4 wherein said host collects search use information and distributes it to the authors.

15. The investment research delivery device of claim 4 wherein said host collects retrieve use information and distributes it to the authors.

16. The investment research delivery device of claim 4 wherein said view station notifies the investor of research of interest by displaying a headline for the research.

17. The investment research delivery device of claim 16 wherein the headlines for research is extracted by the host from a .key file created by the authors to accompany the page description format research.

18. A device for delivering an author's investment research to investors comprising:

an author station at an author location for generating investment research in a page description format and for generating entitlement information regarding distribution of the research;

a host for receiving the page description format research and associated entitlement information from the author station, said host for generating an instruction based upon the entitlement information regarding remote storage of the page description format research;

a transmitter at the host location for broadcasting the page description format research, and for transmitting the remote storage instruction to the investors;

a remote database at the investors' locations for receiving the remote storage instruction, and for receiving and storing the page description format research according to the remote storage instruction.

19. The investment research delivery device of claim 18 wherein said remote database discards as much of the page description format research which has been stored on the investors' databases for the longest time as necessary to store the received research.

20. The investment research delivery device of claim 18 wherein said host includes a database and an indexer for indexing a text portion of the page description format research, and wherein the index is stored on said host database.

21. The investment research delivery device of claim 18 wherein the page description format is portable document format.

22. The investment research delivery device of claim 18 wherein said author station receives investment research in PostScript format and converts the PostScript format to a different page description format.

23. The investment research delivery device of claim 22 wherein the different page description format is portable document format.

24. The investment research delivery device of claim 18 including a view station at investors' locations for rendering the page description format research to display it in the author's original form for review by investors.

25. The investment research delivery device of claim 24 wherein said view station converts the page description format research to PostScript format for printing the research in the author's original form for review by investors.

26. The investment research delivery device of claim 18 wherein said transmitter broadcasts the page description format research.

* * * * *